United States Patent [19]

Kunin et al.

[11] Patent Number: 4,572,742
[45] Date of Patent: Feb. 25, 1986

[54] PRECOAT FILTER AND METHOD FOR NEUTRALIZING SUGAR SYRUPS

[75] Inventors: Robert Kunin, Yardley, Pa.; Eli Salem, Deal, N.J.

[73] Assignee: The Graver Company, Union, N.J.

[21] Appl. No.: 536,687

[22] Filed: Sep. 28, 1983

[51] Int. Cl.⁴ .............................................. C13D 3/14
[52] U.S. Cl. .................................... 127/46.2; 127/55; 210/777
[58] Field of Search ....................... 127/46.1, 46.2, 55; 210/670, 691, 694, 777, 778, 193, 663

[56] References Cited

U.S. PATENT DOCUMENTS

| | | | |
|---|---|---|---|
| 2,391,649 | 12/1945 | Shafor | 127/46 |
| 2,744,840 | 5/1956 | Daniels et al. | 127/46 |
| 3,250,702 | 5/1966 | Levendusky | 210/24 |
| 3,250,703 | 5/1966 | Levendusky | 127/46.2 |
| 3,680,700 | 8/1972 | Ryan | 210/777 |
| 3,779,386 | 12/1973 | Ryan | 210/193 |
| 4,014,711 | 3/1977 | Odawara et al. | 127/46 B |
| 4,157,267 | 6/1979 | Odawara et al. | 127/46.2 |
| 4,187,120 | 2/1980 | Kunin et al. | 127/46 A |
| 4,190,532 | 2/1980 | Halbfoster | 210/75 |
| 4,238,334 | 12/1980 | Halbfoster | 210/777 |
| 4,358,322 | 11/1982 | Neuzil et al. | 127/46.2 |

FOREIGN PATENT DOCUMENTS 768278  2/1957  United Kingdom .

OTHER PUBLICATIONS

Ecodyne Bulletin WC-151, "Graver Powdex ®, Ecodex ®, Ecocote ® Filter Precoats that do more than Filter," 12/77.

Primary Examiner—Ivars Cintins
Attorney, Agent, or Firm—Dressler, Goldsmith, Shore, Sutker & Milnamow, Ltd.

[57] ABSTRACT

A method for treating a sugar syrup to neutralize, decolorize and decalcify the sugar syrup during the clarification and decolorization process of sugar refining comprises contacting a sugar syrup with a neutralizing precoat filter layer disposed on a porous support means. The precoat filter layer comprises a liquid slurry constituted by an aqueous suspension of fibrous filter aid material and a neutralizing amount of particulate, crystalline alumino-siliate molecular sieve having an average particle size of less than 10 microns.

14 Claims, No Drawings

PRECOAT FILTER AND METHOD FOR NEUTRALIZING SUGAR SYRUPS

TECHNICAL FIELD

This invention relates generally to the treatment of sugar, and more particularly to a method for neutralizing and for decalcifying a sugar syrup with precoat filters during the clarification and decolorization steps of the sugar refining process.

BACKGROUND ART

The major sources of sucrose for use as white table sugar are sugar beets and sugar cane. The main property that distinguishes refined sugar from raw sugar is its white color. Decolorization, therefore, is a key step in the sugar refining process and in the production of a marketable product. Raw sugar contains non-sugar impurities, such as chromophoric or color forming components and certain trace metals ions including iron, copper, zinc and nickel as well as calcium. These impurities can produce a colored sugar product which is often unacceptable to the consumer. Thus, the impurities must be removed during the decolorization process.

The chromophoric materials in raw sugar typically exist as highly-colored anions, initially in the form of salts of weak acids. However, the chromophoric components may be either highly ionic, weakly ionic, or non-ionic species. The trace metals may either exist as cations, or may be complexed with organic acids or color forming components as anionic complexes. Moreover, the presence of calcium ions can cause scaling during the evaporation of a sugar syrup and can result in the production of poor quality liquid sugar and sugar crystals.

The sugar refining industry, particularly the cane sugar refining industry, traditionally decolorizes sugar by using carbon adsorbents as the principal method of decolorization. Carbon adsorbents are well known in the art and typically include powdered carbons, bone char (carbonized bone particles) and granular carbon. Many of the sugar colorants are, therefore, anionic in nature and can be removed from solution by ion exchange materials. Some refineries have replaced carbon adsorbents in whole or in part with anion-exchange resins. Calcium ions are removed from sugar syrup with cation exchange resins.

During the decolorizing of sugar syrup, particularly from sugar cane, with activated carbons and anion exchange resins, the pH value of the syrup drops substantially below pH 7. It is not uncommon, therefore, for the acidity in a sugar syrup to reach a pH value as low as 1.5 to 2.5. It is well known that acidic conditions promote the hydrolysis of a disaccharide, such as sucrose, to its corresponding monosaccharide units, fructose and glucose, in a process known as inversion. When a sugar syrup is warmed, such as during a filtration process, the rate at which inversion takes place increases.

Unless the acidity of sugar syrup is neutralized, a substantial loss in sucrose yield can occur as a result of inversion. Consequently, during the industrial clarification of sugars, commonly referred to in the art of sugar refining as "defecation," alkalizing agents including magnesium oxide and calcium oxide (lime), are generally added to a sugar syrup to maintain the pH of the sugar syrup at a value greater than pH 7. This procedure, however, is costly and adds uncontrolled quantities of metal cations to the treated syrup.

Carbon adsorbents are general adsorbents. As a result, they adsorb most materials from sugar syrup, including sugar, with little or no selectivity. Powdered carbons can only be used once or twice and are expensive. Granular carbon has no ion-exchange properties, does not remove ash, and must contain magnesium carbonate for pH control. Bone char has ion-exchange properties and removes considerable ash from the sugar. Bone char comprises about 6 to 10 percent carbonaceous residue and about 90 percent calcium phosphate supplied by the degreased cattle bones from which it is prepared. Consequently, bone char does provide a buffering effect that keeps the pH value of the sugar syrup from dropping and is regenerable on heating. However, the buffering capacity of bone char initially is low and decreases with use. Further, the use of bone char requires a substantial capital investment in plant equipment, uses considerable energy resulting in a high cost of fuel for the kilns used to regenerate the bone char and increases the cost of sweet water evaporization. Conventional ion-exchange processes using regenerable deep beds of ion-exchange resins for decolorization are also costly, generate substantial amounts of sweet water, require large volumes of hot rinse water and may pose chemical waste problems.

It is commercially desirable to remove non-sugar contaminants from a sugar syrup prior to the defecation step because liming (the addition of calcium oxide to the syrup to control the pH) can increase the ash content. Thus, a need exists to minimize or eliminate the defecation step by eliminating non-sugar components early in the process before these components adversely affect the color and quality of the crystallized sugar. It may also be necessary to decolorize final syrups prior to crystallization of the sugar. Here again, pH control is important.

BRIEF SUMMARY OF THE INVENTION

This invention relates to a method for minimizing or avoiding a substantial drop in pH value of a sugar syrup during the treatment of a raw or treated sugar in the refining process. More particularly, sugar syrup is neutralized, decolorized and decalcified during the clarification and decolorization process without the addition of neutralizing alkalizing agents in a separate step.

As used herein, the term "decalcify" means the removal of calcium and any other multivalent cations including magnesium, nickel, copper and lead.

The method of this invention comprises the steps of:
providing a porous support means;
precoating the porous support means with a liquid slurry constituted by an aqueous suspension of a fibrous filter aid material and a neutralizing amount of particulate, crystalline alumino-silicate molecular sieve having an average particle size of less than about 10 microns to form a precoat filter layer substantially coextensive with the porous support means; and
contacting the sugar syrup with said precoat filter layer by passing said sugar syrup through said precoat filter layer and said porous support means at a rate sufficient to neutralize, decolorize and decalcify the sugar syrup.

Crystalline alumino-silicates that are molecular-sieve zeolites have nonframework, exchangeable cations of group IA and group IIA elements including sodium, potassium, magnesium and calcium. The cations are mobile and ordinarily undergo ion exchange. Thus, this type of inorganic cation exchanger quantitatively exchanges hydrogen ions for alkali metal and alkali earth metal ions in a sugar syrup as the syrup passes through a filter bed. As used herein, "filter aid material" refers to those materials which in conventional practice can be deposited on a porous support means to aid in the filtration process. Such materials are well known in the art, and include cellulose fibers, diatomaceous earth, charcoal, expanded perlite, asbestos fibers and polyacrylonitrile fibers. The foregoing materials are typically characterized by an electronegatively charged surface in the presence of water.

As used herein, the term "porous support means" refers to a filter screen, an annular or tubular filter cartridge element, a film or the like. The term "filter bed" refers to a porous support means having a precoat filter layer disposed thereon as described herein. In general, the use of a shallow bed is preferred over a deep bed because a shallow bed minimizes the pressure drop normally associated with the use of deep beds, thereby generally increasing the run length that is available.

In U.S. Pat. No. 3,250,702, which issued to Levendusky and is assigned to the assignee of the present invention, a precoat filter having ion exchange resins is discussed having a surprisingly low resistance to flow. However, the Levendusky precoat filter primarily removes suspended solids while simultaneously performing the ion exchange operation. The resins used are of the strong acid cation and strong base anion type which are well known in the art and provide hydrogen and hydroxyl ions, respectively. Further, Levendusky does not disclose either the use of zeolites or a fibrous material in a precoat filter.

The use of an organic fibrous material as a filter aid in combination with cation and anion resins of the type described by Levendusky is described by Halbfoster in U.S. Pat. No. 4,190,532 which is also assigned to the assignee of the present invention. However, this mixture is used in systems where the removal of suspended solids is the primary objective and ion exchange requirements are secondary. Halbfoster does not describe the use of zeolites in combination with a fibrous filter aid.

U.S. Pat. No. 2,744,840 to Daniels et al. relates to a method for purifying a sugar juice at a controlled pH by passing a sugar solution through a mixed bed of anion and cation exchange resins. The cation exchange resin exchanges hydrogen ions for sodium, potassium, calcium and magnesium ions; and the anion exchange resin adsorbs the hydrogen ions and releases hydroxyl ions into the solution. However, Daniels et al. do not disclose the use of either zeolites or precoat filters. The Daniels process maintains the resins in a deep bed, and it is well known that such beds usually produce pressure drop problems during filtration. Moreover, there is still a tendency for the pH of the sugar juice to drop to a value of about pH 4.0.

In U.S. Pat. No. 2,391,649, Shafor teaches the use of a non-precipitating pH-adjusting agent, such as hydrochloric acid or sodium hydroxide to optimize chemical bleaching of sugar with calcium hypochlorite. The sugar solution is subjected to the action of a cation exchanger in the hydrogen cycle and an anion exchanger in the hydroxyl cycle to remove the ionic matter introduced by the neutralizing agent. Unlike the present invention, the Shafor process relies on organic ion exchangers of the type called organolites rather than the inorganic zeolite ion exchangers of the present invention.

British Pat. No. 768,278 to Spillmann describes a method using a single cation exchanger to treat a sugar solution without substantially changing the pH value of the solution. That method, however, involves exchanging calcium, potassium and sodium ions with ammonium ions. The sugar juices thus obtained are not suitable for concentration by evaporation because the pH value can fall to about 4 during the evaporating process as the ammonium ion splits off and free acids are released. As a result, the process requires further treatment of the sugar juice with an excess of calcium hydroxide which is subsequently removed by saturating the solution with carbon dioxide to pH 7 to produce water insoluble calcium carbonates. It is known that insoluble carbonates increase the ash content and cost of treatment.

Crystalline alumino-silicates, commonly referred to as zeolites are high capacity, selective adsorbents. Zeolites separate molecules based upon the size and configuration of the molecule relative to the size and geometry of the main apertures of the crystalline structures. This property has been used to separate fructose from glucose in invert sugar solutions as described by Neuzil et al. in U.S. Pat. No. 4,358,322 and by Odawara et al. in U.S. Pat. No. 4,014,711. However, neither of the foregoing processes disclose or suggest the use of zeolites for controlling the pH value of a sugar syrup to avoid the inversion of sucrose to fructose and glucose. In addition, the zeolites preferred in this invention are rejected by Neuzil et al. and by Odawara et al. as being less suitable for the processes disclosed.

The present invention contemplates a method for maintaining the pH value of a sugar syrup containing disaccharides, such as a cane sugar syrup, a corn sugar syrup and a beet sugar syrup, substantially above a pH value favoring the formation of invert sugars, while simultaneously decolorizing and decalcifying the sugar syrup. The method overcomes many of the difficulties involving the use of carbon adsorbents and conventional ion exchangers by means of a thin precoat filter system comprising a layer of fibrous filter aid material in combination with an alumino-silicate molecular sieve zeolite in place of conventional ion exchange beads in deep beds as described herein.

Thin precoat filter systems are known to be superior to conventional ion exchange systems. Commercially available ion exchange resin precoat filters are sold for industrial use under the trademarks Powdex ® and Ecodex ® by the assignee of this invention. The present precoat filter is particularly compatible with the commercially available food-grade, single-use precoat filter sold under the trademarks Ecosorb ® C and Ecosorb ® R by the assignee of this invention, and may be used in combination with these formulations to achieve the desired level of sugar syrup neutralization. Thus, the present invention offers the same commercial advantages of the Ecosorb ® technology over the use of regenerable systems as reflected in reduced capital costs, lowered space requirements, reduced sugar losses, reduced energy requirements, consistent sugar quality, excellent clarification and elimination of chemical regenerants.

The ion exchange precoat filter resins are usually relatively inexpensive so that they can be economically discarded after exhaustion or can be regenerated in situ, that is, without removing the precoat layer from the support means by a backwash step. Similarly, as will be described, the precoat filter layer of this invention can also be regenerated by delivering a brine solution, having a pH adjusted to a value of between about 7 and 10 with sodium hydroxide or ammonium hydroxide, through the precoat filter layer in a service cycle direction.

A particular benefit of this invention is the removal of calcium ion along with the removal of non-sugar impurities in a single step of the sugar refining process.

Still further benefits and advantages of the present invention will become apparent to those skilled in the art from the detailed description of the invention, the examples and the claims which follow.

DISCLOSURE OF THE INVENTION

One embodiment of the above described method of treating a sugar syrup according to the present invention includes the step of preparing a precoat filter layer including a fibrous filter aid material and a neutralizing amount of a particulate crystalline alumino-silicate molecular sieve.

The term "neutralize" in its various grammatical forms means the quantitative exchange of hydrogen ions in the sugar syrup for alkali metal, alkali earth metal or volatile base cations provided by non-framework cations in the zeolites described herein to maintain the pH of a sugar syrup at a value between about 7 and 10. As used herein, the term "decalcify" means the removal of calcium and any other multivalent cations including magnesium, nickel, copper and lead.

It should also be understood that the term "sugar syrup" includes either a raw juice as expressed from a sugar source (cane, beet, etc.), a treated sugar solution or a sugar syrup normally resulting during the sugar refining process in the steps commonly referred to as affination, defecation and sweetening off. More particularly, the term "sugar syrup", as used herein, means any juice, solution or syrup containing the disaccharide, sucrose, capable of hydrolyzing to its invert sugars, fructose and glucose, present during the sugar refining process.

Crystalline alumino-silicates are molecular-sieve zeolites having nonframework exchangeable cations preferably selected from the group consisting of IA and IIA elements, such as sodium, potassium, magnesium and calcium. A zeolite can be of natural or of synthetically prepared origin. It is to be understood that references to zeolites hereinafter include zeolites of either synthetic or natural origin. Zeolites include molecular sieves commonly referred to as zeolite type A, X or Y, along with a synthetic form of mordenite.

It is known that the effective pore diameter of a synthetically prepared or natural zeolitic molecular sieve is controlled by the size of the nonframework exchangeable metal cation. For example, sodium Zeolite A, having exchangeable sodium cations, has an apparent pore diameter of 3.6 to 4.0 Angstrom units, depending on temperature, and is generally referred to as 4 A. The potassium form of Zeolite A (KA) has a pore diameter of 3.3 Angstrom units and is usually referred to as 3 A. When calcium cations are exchanged for at least about 40 percent of the sodium cations, the resulting calcium Zeolite A has an apparent pore size from about 4.2 to about 4.4 Angstrom units and is usually referred to as 5 A.

For purposes of this invention, a particulate, type A zeolite having an average particle size of less than 10 microns is preferred. Zeolite A is normally commercially available in the sodium or potassium form. For purposes of the method of this invention, however, the choice of cation is not so limited and other cation forms, such as an ammonium, a calcium, and a magnesium form zeolite can be used. A particularly preferred commercially available sodium Zeolite A suitable for use in the precoat filter of this invention is in the form of a microcrystalline powder having an average particle size of less than about 10 microns, preferably of less than about 5 microns.

In an embodiment of this invention, a liquid slurry is prepared constituting an aqueous suspension of a fibrous filter aid material and a zeolite as described below. Once the liquid slurry has been prepared, it is precoated onto a porous support means, such as a filter means, according to methods which are well known in the art, such as shown and described in U.S. Pat. No. 3,779,386, issued to Ryan, the disclosure of which is incorporated herein by reference. Simply described, a precoat filter layer is formed by recirculating the aqueous suspension through a porous support means until a clarified effluent is obtained and the precoat filter layer is substantially coextensive with the porous support means. The precoat filter layer is then ready for use in neutralizing sugar syrup according to the present invention by contacting the sugar syrup with the precoat filter layer and by passing the sugar syrup through the precoat layer and the porous support means.

In a preferred embodiment, the previously described porous support means is a tubular filter cartridge element, such as shown and described by Ryan in the forementioned U.S. Pat. No. 3,779,386. However, the filter element can also include wound layers of yarn or a similar strand material, such as nylon, orlon, polypropylene, cotton and the like. The precoating step is preferably accomplished as set forth in the Ryan Patent to produce a precoat filter layer of between 1/16 and 2 inches thick, preferably ⅛ to 1 inch thick, and most preferably between ⅛ to ⅝ inch thick. It is desirable to form a precoat filter layer on a filter element of between about 0.1 and 1.0 pounds per square foot of filter area.

The fibrous filter aid material referred to above is preferably a fibrous substance constituted of fibers each having a diameter of less than 50 microns and a length of less than 1 millimeter. The filter aid material is typically characterized by a negative surface charge in aqueous suspension. Suitable filter aid materials are well known in the art and include cellulose fibers, diatomaceous earth, charcoal, expanded perlite, asbestos fibers and polyacrylonitrile fibers. A particularly preferred filter aid material for use in accordance with the present invention is alpha-cellulose fiber available commercially under the trademark Solka-Floc, sold by the Brown Company.

In preparing a liquid slurry of neutralizing precoat filter to be precoated on a porous support means, a preferred method is to suspend a neutralizing amount of zeolitic molecular sieve in a relatively large volume of demineralized water, such as 10 gallons of water per pound of zeolite. A filter aid material is then added with continuous stirring. After a period of stirring sufficient to ensure homogeneous mixing; for example, 5 to 20 minutes, the liquid slurry is precoated onto a porous support means as previously described. The general technique of preparing and using a flocculated precoat of filter particles, including ion exchange resins smaller than 100 mesh, and a filter aid material is also described in detail by Kunin et al. in U.S. Pat. No. 4,187,120, the disclosure of which is incorporated herein by reference. In a preferred embodiment, the ratio of zeolite to filter aid material in the liquid slurry is from between about 1:9 and about 9:1 based on dry weight of materials. Most preferably, the dry weight ratio of zeolite to filter aid material is between 1:1 and 2:1.

In another embodiment of the present method, a sugar syrup to be neutralized, decolorized and decalcified is preferably passed through a precoat filter layer and a porous support means of this invention at a flow rate of between about 0.05 to 2 gallons per minute per square foot. The temperature of a sugar syrup being so treated, is preferably within a range of from about 40 degrees F. to 180 degrees F.

During the first stages of raw sugar production at a sugar mill, many of the impurities of cane syrup are normally removed by adding a lime suspension to the syrup to produce a pH value of about 8.5. The syrup is subsequently heated to about 220 degrees F. for a period of about 20 minutes, after which the treated syrup must be clarified and filtered before subsequent crystallization. This process produces crystals commonly called raw sugar. During the refining of the crystallized raw sugar, the crystals are, at times, mingled with sugar syrup and centrifuged in a process commonly known as defecation which washes the surface of the crystals. The washed sugar crystals are dissolved and treated with lime and phosphates to yield a sugar syrup having a pH value of about 7.3. The hot syrup is then clarified and filtered in a process called affination.

It is now found that the use of a fibrous precoat filter including a zeolitic molecular sieve, preferably a Zeolite A, maintains the pH value of the sugar syrup at a pH value of from about 7 to about 9, preferably from about 7 to 8.5, during the decolorization process which follows the affination and defecation processes, thereby eliminating the need to add neutralizing agents, such as lime, to the sugar syrup. The method of this invention provides a quantitative exchange of hydrogen ions that produce acidity in a sugar syrup for the nonframework exchangeable alkali and alkali metal cations of a Zeolite A. Calcium ions are also simultaneously removed by the method of this invention thereby improving the quality of the sugar crystals and minimizing scale buildup in the evaporator units.

It is known that the use of thin precoat filter technology for the clarification and decolorization of cane sugar syrups provides advantageous run lengths with pressure drops of less than about 50 psig (pounds per square inch gauge—uncorrected for atmospheric pressure) for a high-Brix syrup. The term "Brix" refers to a measure of the concentration in percent of sugar by weight according to the well known Brix hydrometer scale.

It is believed that a zeolite-containing precoat filter of this invention provides a naturally porous agglomerated material which presents a relatively low pressure drop in a precoat filter layer, typically believed to be less than about one psig for water at four gallons per minute per square foot at 77 degrees F. This effect is believed to be attributable to the unique crystalline properties of zeolitic molecular sieves. Crystalline molecular-sieve exchangers do not follow the typical rules and patterns exhibited by organic and other inorganic ion exchangers. In zeolite adsorption processes, the adsorbate is believed to migrate into the zeolite crystal so that the exchange behavior of nonframework cations in the zeolites is influenced by the nature of the cation, the temperature, the concentration and, to some degree, the anion species.

It is known that a particulate ranging in size from between about 1 and 75 microns is desirable in precoat filters based on ion exchange resins as described in the forementioned U.S. Pat. No. 4,187,120. Most ion exchange resins, however, are primarily available in large bead form and must be ground to the size range desired. Thus, a zeolite in the precoat filter of this invention provides for a naturally porous microcrystalline particulate of average particle size below 10 microns which is believed to provide for a combination of adsorption by ion-exchange mechanisms and adsorption of color-causing materials by a molecular-sieve mechanism. The kinetics of the neutralizing, decolorizing and decalcifying effects of the precoat filter layers of this invention are not fully understood.

It is also further believed that zeolitic molecular-sieves having an average pore diameter of less than about 5 Angstrom units adsorb only the non-sugar color-forming components, without adsorbing sugar, thus enhancing the efficiency of the filtration and resulting in less sweet water. Sweet water is typically generated when water is used to remove sugar products left in the bed towards the end of the service cycle. It is well known, for example, that carbon adsorbents are general adsorbents and adsorb everything out of a sugar syrup, including sugar, with little selectivity. Thus, carbon adsorbents generate substantial amounts of sweet water.

The precoat filter of this invention is particularly compatible with the previously mentioned commercially available precoats, Ecosorb® C and Ecosorb® R, and can be mixed with those precoats to achieve the desired level of neutralization during sugar refining. These commercial precoats are based upon powdered activated carbon (Ecosorb® C) and chloride-form anion exchange resins (Ecosorb® R). Preferably the Ecosorb® C mixture and the Ecosorb® mixture are usually used in tandem systems because the latter precoat is more expensive than the former. The procedure of this invention is consistent with such practice and the practice of most cane refiners using columnar and regenerable ion exchange beds following the use of some sort of carbonaceous adsorbent.

This invention is further illustrated in the following examples which are not intended to be limiting.

BEST MODE FOR PERFORMING THE INVENTION

EXAMPLE 1

Treatment Of Sugar Syrups With And Without A Neutralizing Precoat Filter

This example illustrates the comparative effect of using a neutralizing precoat filter of this invention containing a Zeolite A and a commercially available precoat filter containing no Zeolite A to treat a sugar syrup.

Two millipore filter membranes (5 microns pore diameter), each 47 millimeters in diameter, were precoated with a slurried precoat filter layer in the manner described above. The first precoat filter layer on the first membrane was a commercially available fibrous precoat filter containing anion exchange resin in the chloride form and alpha cellulose, sold under the trademark ECOSORB ® R by the assignee of this invention. The second membrane was precoated with an ECOSORB ® R precoat filter further including 10 weight percent of a sodium Zeolite A having an average particle size of about 5 microns.

An affinated, defecated and carbon-treated cane sugar syrup having a color value of 500 ICUMSA units, and a Brix syrup value of 65 degrees was heated to 176 degrees F. (80 degrees C.). Color is generally measured by the well known ICUMSA color absorbance method four (1970) and reported in ICUMSA units which are the attenuation index of a sugar solution multiplied by 100. A heated syrup was passed through one of the precoated filter membranes at a flow rate of 0.1 gallon per minute per square foot and the pH value of the sugar syrup was constantly monitored. The pH value data for each of the filter runs measured at the inlet end and at the outlet end of the filtration vessel is set forth below.

|  | pH Value of Sugar Syrup | |
| --- | --- | --- |
|  | Filter #1 Without Zeolite A | Filter #2 With Zeolite A |
| Inlet pH | 6.2 | 6.2 |
| Outlet pH |  |  |
| Initial | 4.8 | 8.0 |
| Average | 5.5 | 7.5 |

The data show that the neutralizing precoat, filter #2, containing Zeolite A, maintained the pH value of the sugar syrup at a substantially neutral value during the treatment.

EXAMPLE 2

Neutralization and Decalcification of Sugar Syrup With A Neutralizing Precoat Filter This example illustrates the neutralization and decalcification of a sugar syrup during treatment of the sugar syrup with a neutralizing precoat filter of this invention.

The procedure of Example 1 was followed except that a melted granular sugar having a Brix syrup value of 65 degrees was used in a 7 hour run through a neutralizing precoat filter prepared following the method for the preparation of filter #2. The pH value of the sugar syrup was monitored and the amount of calcium ion was determined in parts per million (ppm) by well-known analytical methods at the start and at the end of the run. The data for the filter run is set forth below.

|  | Value Determined | |
| --- | --- | --- |
|  | At Inlet | At Outlet |
| Calcium | 50 ppm | 1 ppm |
| pH | 6.0 | 7.5 |

The data show that the neutralizing precoat filter #2, containing Zeolite A, removed calcium ions and neutralized the sugar syrup during the treatment to provide a substantially neutral, calcium-free sugar syrup.

While the present invention has been described with reference to several specific embodiments, it will be understood that all of the equivalent forms or ramifications thereof are also contemplated. Moreover, the words used are words of description rather than of limitation, and various changes can be made without departing from the spirit or scope of the invention disclosed herein.

That which is claimed is:

1. A method for neutralizing, decolorizing and decalcifying a sugar syrup including sucrose comprising the steps of:
providing a porous support means;
precoating the porous support means with a liquid slurry constituted by an aqueous suspension of a fibrous filter aid material and a neutralizing amount of a particulate, crystalline alumino-silicate molecular sieve having an average particle size of less than about 10 microns to form a precoat filter layer substantially coextensive with the porous support means; and
contacting the sugar syrup with said precoat filter layer by passing said sugar syrup through said porous support means at a rate sufficient to neutralize, decolorize and decalcify the sugar syrup.

2. The method of claim 1 wherein a dry weight ratio of alumino-silicate to filter aid material is present in the liquid slurry in an amount of between about 1:9 and 9:1.

3. The method of claim 1 wherein the alumino-silicate molecular-sieve is a zeolite.

4. The method of claim 1 wherein the alumino-silicate is a Zeolite A having nonframework exchangeable cations selected from the group consisting of alkali metal, alkali earth metal and ammonium.

5. The method of claim 1 wherein the fibrous filter aid material comprises fibers each having a diameter of less than 50 microns and a length of less than 1 millimeter.

6. The method of claim 1 wherein the alumino-silicate is sodium Zeolite A and the fibrous filter aid material is alpha-cellulose.

7. The method of claim 1 wherein the precoat filter layer further includes a carbonaceous adsorbent.

8. The method of claim 1 wherein the precoat filter layer further includes a chloride-form anion exchange resin.

9. The method of claim 1 wherein the precoat filter layer is present in an amount of between about 0.1 and 1.0 pounds per square foot.

10. The method of claim 1 wherein a sugar syrup is passed through said precoat filter layer and said porous support means at a temperature of between about 40 and 180 degrees F. and a flow rate of between about 0.05 and 2 gallons per minute per square foot.

11. The method of claim 1 further comprising the step of regenerating said precoat filter layer by delivering a brine solution through said precoat filter layer, while said precoat filter layer remains on said support means.

12. The method of claim 11 wherein the regenerating step includes adjusting the pH value of the brine solution to between about 7 and about 10.

13. A method for neutralizing, decolorizing and decalcifying a sugar syrup including sucrose comprising the steps of:
providing an annular porous support means;
precoating the porous support means with a liquid slurry constituted by a fibrous filter aid material and a neutralizing amount of particulate Zeolite A having an average particle size of less than 5 microns to form a precoat filter layer of between 0.1 to 0.2 pounds per square foot of the porous support means; and
contacting the sugar syrup with said precoat filter layer by passing said sugar syrup through said precoat filter layer and said porous support means at a rate of about 0.05 to 2 gallons per minute per square foot.

14. The method of claim 13 wherein the Zeolite A is sodium Zeolite A and the fibrous filter aid material is alpha-cellulose.

* * * * *